UNITED STATES PATENT OFFICE.

HENRY R. CURME, OF PITTSBURGH, PENNSYLVANIA, ASSIGNOR TO UNION CARBIDE COMPANY, OF NEW YORK, N. Y., A CORPORATION OF VIRGINIA.

PROCESS OF MAKING ETHYL SULFATES.

1,339,947.     Specification of Letters Patent.     Patented May 11, 1920.

No Drawing.     Application filed July 7, 1919. Serial No. 309,027.

*To all whom it may concern:*

Be it known that I, HENRY R. CURME, a citizen of the United States, residing at Pittsburgh, in the county of Allegheny and State of Pennsylvania, have invented certain new and useful Improvements in Processes of Making Ethyl Sulfates, of which the following is a specification.

It is known that alcohol may be synthesized from ethylene by a process involving the successive steps of absorbing ethylene in concentrated sulfuric acid (98–100%) to form ethyl hydrogen sulfate, and then hydrolyzing this ester with formation of alcohol and dilute sulfuric acid. The reactions involved in this known process are usually expressed as follows:—

1. $C_2H_4 + H_2SO_4 \rightarrow C_2H_5.HSO_4$
2. $C_2H_5.HSO_4 + H_2O \rightarrow C_2H_5OH + H_2SO_4$.

It is also known that ether may be prepared from the ethyl hydrogen sulfate by reacting thereon with alcohol, according to the reaction:—

3. $C_2H_5.HSO_4 + C_2H_5OH \rightarrow (C_2H_5)_2O + H_2SO_4$.

It is also known that propylene and other higher homologues of ethylene, by absorption in concentrated sulfuric acid, may yield directly di-propyl sulfate; but so far as I know the production of di-ethyl sulfate from ethylene under these conditions has never been experimentally observed.

I have found that when ethylene, substantially free from diluting gases, is brought into sufficiently intimate contact with sulfuric acid at an appropriate temperature, the ethylene being preferably in large excess of the quantity which can be absorbed by the sulfuric acid in a single passage therethrough, there is produced in addition to ethyl hydrogen sulfate and simultaneously therewith, a certain proportion of di-ethyl sulfate $(C_2H_5)_2SO_4$. This substance is formed before the sulfuric acid has been completely transformed into ethyl hydrogen sulfate, and can be produced in and removed from the solution while sulfuric acid still remains therein in an uncombined state. Di-ethyl sulfate has a higher vapor tension at the reacting temperature than either ethyl hydrogen sulfate or sulfuric acid, and by suitable control of the temperature and of the volume of ethylene passing through the liquid the di-ethyl sulfate can be vaporized or entrained substantially as formed, and can be recovered in a state of substantial purity in a suitable condenser.

It is not necessary in this process to use sulfuric acid of high concentration: on the contrary 66° Bé. acid (approximately 93% $H_2SO_4$) has proven entirely satisfactory in practice. After the absorption of the ethylene has proceeded to some extent, so that the strong affinity of sulfuric acid for water is somewhat weakened, some water is found to be entrained with the current of ethylene and to collect in the condenser with the di-ethyl ester. Since, however, the latter is immiscible with water, it is easily parted and recovered in a state of substantial purity. It follows from the above that the sulfuric acid used undergoes actual concentration in the process and at the reacting temperature, which may be considerably varied but should not exceed 150° C. This permits me to start the operation with relatively dilute sulfuric acid, as compared with the very high concentrations (98–100% $H_2SO_4$) which have heretofore always been regarded as an essential condition for the ethylene absorption. As will be readily understood this effects a very great economy in the process, since the dilute acid resulting from the subsequent hydrolysis of the ethyl hydrogen sulfate, or of the di-ethyl sulfate, may be readily and cheaply re-concentrated to about 66° Bé., and is then suitable for use in continuing or repeating the process. Furthermore, to the extent that di-ethyl sulfate is formed a further economy of sulfuric acid is of course brought about, since the proportion of acid required for the formation of this ester is only one-half of that needed for making ethyl hydrogen sulfate.

While my invention is not limited to the details of procedure below set forth, I now prefer to proceed substantially as follows:

Ethylene in a state of substantial purity and practically free from diluting gases is injected into and brought into intimate contact with a bath of sulfuric acid having an initial concentration of about 93% $H_2SO_4$. The desired intimacy of contact may be brought about by agitation of the bath or by minute subdivision of the gas in any desired manner. The bath is preferably maintained at about 100° C., more or less, and a strong current of ethylene is used, the effluent gas being passed first to a condenser and then returned through the circulating system to the acid bath, sufficient ethylene being introduced from an outside source to maintain the desired volume of flow. For the best economy in the process the ethylene should be practically free from inert gases, in order that continuous circulation may be maintained without the necessity of discarding any portion of the gas.

The reaction carried out as above is unusually elastic in the sense that any desired proportion of di-ethyl sulfate may be obtained, depending upon the duration of treatment of the sulfuric acid with the ethylene. If the ethylene is passed through the acid for a few hours only, say 5–6 hours, a relatively small proportion of the absorbed ethylene usually about 10–15%, will be found to have been transformed into and recovered as di-ethyl sulfate, the principal portion of the absorbed ethylene remaining in the reaction vessel, substantially as ethyl hydrogen sulfate, together with some di-ethyl sulfate which has not been entrained, and more or less unchanged sulfuric acid. However, as the passage of ethylene is continued, more and more di-ethyl sulfate is formed and carried over to the condenser, so that eventually practically all of the sulfuric acid may, if desired, be transformed into pure di-ethyl sulfate. In this manner the process may be made to yield almost entirely ethyl hydrogen sulfate, or, almost entirely di-ethyl sulfate, or any desired proportion of these esters.

The di-ethyl sulfate may be utilized directly for the production of alcohol and ether by hydrolysis, the resulting sulfuric acid being re-concentrated to 66°Bé. and re-used in the process. The di-ethyl ester may also be used to advantage in the known processes of ethylation.

I claim:—

1. Process of making ethyl sulfates, comprising passing ethylene in excess in contact with sulfuric acid, forming thereby ethyl hydrogen sulfate and di-ethyl sulfate, entraining di-ethyl sulfate with the excess of ethylene, and separating it therefrom.

2. Process of making ethyl sulfates, comprising passing ethylene in excess in contact with sulfuric acid having an initial concentration approximating 93% $H_2SO_4$, forming thereby ethyl hydrogen sulfate and di-ethyl sulfate, entraining di-ethyl sulfate with the excess of ethylene, and separating it therefrom.

3. In a process of making di-ethyl sulfate, the steps comprising passing ethylene in excess in contact with sulfuric acid, entraining with the effluent gas a portion at least of the di-ethyl sulfate resulting from the reaction, and recovering the same.

4. In a process of making di-ethyl sulfate, the steps comprising passing ethylene in excess in contact with sulfuric acid having an initial concentration approximating 93% $H_2SO_4$, entraining with the effluent gas a portion at least of the di-ethyl sulfate resulting from the reaction and recovering the same.

5. In a cyclical process of making ethyl sulfates or derivatives thereof, the steps comprising passing substantially undiluted ethylene in excess in contact with sulfuric acid having an initial concentration approximating 93% $H_2SO_4$, hydrolyzing the resulting ethyl esters with formation of relatively dilute sulfuric acid, and re-concentrating the sulfuric acid to approximately the said initial concentration for re-use in the process.

In testimony whereof I affix my signature.

HENRY R. CURME.